(12) United States Patent
Craddock et al.

(10) Patent No.: US 12,075,758 B2
(45) Date of Patent: Sep. 3, 2024

(54) ANIMAL HARNESS AND LEASH SYSTEM

(71) Applicant: Whisoka Pty Ltd, Coorparoo (AU)

(72) Inventors: Lyle Mathew Craddock, Coorparoo (AU); Shonna Hudson, Coorparoo (AU)

(73) Assignee: Whisoka Pty Ltd, Coorparoo (AU)

( * ) Notice: Subject to any disclaimer, the term of this patent is extended or adjusted under 35 U.S.C. 154(b) by 133 days.

(21) Appl. No.: 17/779,041

(22) PCT Filed: Nov. 25, 2020

(86) PCT No.: PCT/AU2020/051271
§ 371 (c)(1),
(2) Date: May 23, 2022

(87) PCT Pub. No.: WO2021/102507
PCT Pub. Date: Jun. 3, 2021

(65) Prior Publication Data
US 2022/0408696 A1 Dec. 29, 2022

(30) Foreign Application Priority Data
Nov. 25, 2019 (AU) .............................. 2019904445

(51) Int. Cl.
*A01K 27/00* (2006.01)
(52) U.S. Cl.
CPC .......... *A01K 27/002* (2013.01); *A01K 27/003* (2013.01)
(58) Field of Classification Search
CPC .. A01K 27/002; A01K 27/003; A01K 27/005; A01K 27/004; A01K 27/00;
(Continued)

(56) References Cited

U.S. PATENT DOCUMENTS 5,517,836 A 5/1996 Hong
6,205,956 B1 * 3/2001 Dickie ................ A01K 27/006
119/776
(Continued)

OTHER PUBLICATIONS

International Search Report and Written Opinion for Application No. PCT/AU2020/051271, dated Feb. 15, 2021.
(Continued)

*Primary Examiner* — Brady W Frazier
*Assistant Examiner* — Zoe Tam Tran
(74) *Attorney, Agent, or Firm* — C. Tumey Law Group PLLC

(57) ABSTRACT

A dog harness assembly comprising: a harness body adapted to be positioned on a chest portion of a dog, a pair of restraint loops coupled with the harness body and adapted to pass respectively under the left and right foreleg pits of the dog, each loop comprising a clasp adapted to be releasably fastened to a fastening arrangement provided in the harness body; a connector located in the harness body for engaging with a locking portion of a leash for allowing a user to exert a force for controlling movements of the dog wearing said harness when the harness is connected to the leash through said connector; a key or combination actuated locking arrangement coupled with said connector to provide a lockable connection between the leash and the harness wherein in a locked configuration the leash connector is prevented from being uncoupled from the connector; wherein the locking arrangement is coupled with said fastening arrangement such that in the locked configuration the clasps of the restraint loops engage with the locking portion of the leash to prevent the clasps from being released from the fastening arrangement and wherein in an unlocked configuration, each clasp only be released from the fastening arrangement after the leash connector has been uncoupled from the connector (Continued)

and by additionally actuating a clasp release mechanism provided on said harness body.

18 Claims, 15 Drawing Sheets

(58) Field of Classification Search
CPC ...... A01K 1/0263; A01K 1/04; A01K 27/001; A01K 13/006; A01K 15/02; A01K 29/00
USPC .......................................................... 119/792
See application file for complete search history.

(56) References Cited

U.S. PATENT DOCUMENTS

| | | | |
|---|---|---|---|
| 7,389,750 B1* | 6/2008 | Rogers | A01K 27/005 119/792 |
| 8,156,901 B2 | 4/2012 | Muelken | |
| 9,357,751 B2 | 6/2016 | Lajoie | |
| 9,386,760 B2 | 7/2016 | Lajoie | |
| 2004/0074267 A1* | 4/2004 | Linares | E05B 41/00 70/210 |
| 2005/0145202 A1* | 7/2005 | Bonner | A01K 27/003 119/792 |
| 2010/0294213 A1* | 11/2010 | Vaccari | A01K 27/005 119/863 |
| 2011/0214260 A1* | 9/2011 | Wang | A44C 5/2076 24/303 |
| 2012/0304942 A1 | 12/2012 | Louro | |
| 2015/0020751 A1* | 1/2015 | Pattie | A01K 27/004 119/770 |
| 2016/0037754 A1* | 2/2016 | Lajoie | A01K 27/002 119/863 |
| 2016/0249589 A1* | 9/2016 | Soto | A01K 27/004 119/794 |

OTHER PUBLICATIONS

International Preliminary Report or Application No. PCT/AU2020/051271, dated Jul. 1, 2021.

* cited by examiner

structured to be received in a detent provided along
ANIMAL HARNESS AND LEASH SYSTEM

TECHNICAL FIELD

The present invention relates to an animal harness and leash system particularly suited for dogs. The harness and leash system may be useful for preventing theft of dogs.

BACKGROUND

Any references to methods, apparatus or documents of the prior art are not to be taken as constituting any evidence or admission that they formed, or form part of the common general knowledge.

Walking the dog while conducting errands has become increasingly popular as a healthy, active option for dog owners. However, fear of dog theft discourages dog owners from tying up their dog outside restaurants, cafes or supermarkets and limits the dog owner's ability to combine daily errands with dog walking.

The inventor has found that most dogs that are stolen are not locked at all and are instead secured using a leash looped through itself that requires very little effort to remove. In some instances, dogs are stolen from places that the dog owners consider safe and often dogs are stolen when they are left unattended and unlocked for short periods of time. For example, a dog owner may leave their beloved dog tied to a fixed object for a just a minute or two while they run into a store, only to find their dog gone when they exit.

In view of the above, it would be desirable to provide a convenient and a harness and leash system that addresses some of the shortcomings of the currently available dog harnesses and leash systems.

SUMMARY OF INVENTION

In one aspect, the invention provides a dog harness assembly comprising: a harness body adapted to be positioned on a chest portion of a dog, a pair of restraint loops coupled with the harness body and adapted to pass respectively under the left and right foreleg pits of the dog, each loop comprising a clasp adapted to be releasably fastened to a fastening arrangement provided in the harness body; a connector located in the harness body for engaging with a locking portion of a leash for allowing a user to exert a force for controlling movements of the dog wearing said harness when the harness is connected to the leash through said connector; a key or combination actuated locking arrangement coupled with said connector to provide a lockable connection between the leash and the harness wherein in a locked configuration the leash connector is prevented from being uncoupled from the connector; wherein the locking arrangement is coupled with said fastening arrangement such that in the locked configuration the clasps of the restraint loops engage with the locking portion of the leash to prevent the clasps from being released from the fastening arrangement and wherein in an unlocked configuration, each clasp only be released from the fastening arrangement after the leash connector has been uncoupled from the connector and by additionally actuating a clasp release mechanism provided on said harness body.

In an embodiment, each of the said clasps in a fastened configuration cooperate to define a through opening for engaging with said locking portion of the leash.

In an embodiment, each clasp comprises a hook portion that is structured to partially surround and engage the locking portion to prevent the clasps from being released from the harness body when the locking portion is located in the opening in the locked configuration.

In an embodiment, the fastening arrangement comprises a pair of biased retainers, each biased retainer being configured for releasably engaging and retaining a respective clasp.

In an embodiment, each biased retainer comprises a notch that is structured to be received in a detent provided along a peripheral portion of the respective clasp such that one or more biasing structures associated with each biased retainer applies a biasing force on the notch to push the notch into the detent.

In an embodiment, each of said biased retainer is located within a recessed channel provided in the harness body.

In an embodiment, the clasp release mechanism comprises a pair of clasp release members, each clasp release member being linked with a corresponding biased retainer and comprising an exposed tab portion such that applying a sufficiently high pushing force on the tab member overcomes the biasing force applied on each biased retainer and releases the notch of the biased retainer from the detent of the respective clasp.

In an embodiment, pushing the tab portion results in movement of the biased retainer within the recessed channel in an axial direction aligned along the spine of the animal wearing said harness assembly.

In an embodiment, the connector comprises a biased locking plate positioned within a recessed portion of the harness body, the locking plate comprising an opening defined by engagement portions of the locking plate for receiving an elongate part of the locking portion and wherein one or more biasing structures applying a biasing force on the locking plate to push the engagement portions of the locking plate into engagement with a detent provided on the locking portion.

In an embodiment, the dog harness assembly further comprises a leash releasing mechanism comprising a leash releasing tab that is exposed for receiving a pushing force from a user such that applying a sufficiently high pushing force on the leash releasing tab overcomes the biasing force applied on the locking plate and results in movement of the locking plate to sufficiently disengage the engagement portion of the locking plate to allow the locking portion to be withdrawn out of the opening of the locking plate.

In an embodiment, the locking arrangement, in the locked configuration, resists movement of the locking plate sufficiently to prevent the locking portion from becoming disengaged with the locking plate.

In an embodiment, the locking arrangement comprises a combination lock with one or more rotating dials mounted on a biased lock spindle with each rotating dial being associated with a notched circular disc such that rotation of the dial along the spindle results in rotation of the notched disc wherein the locking plate comprises one or more corresponding apertures, each aperture being sized for accommodating the dial and the associated notched disc such that in an unlocked configuration, the notch is located within the aperture thereby allowing the locking plate to be pushed when force is applied on the leash releasing tab and wherein in the locked configuration the disc portion of the notched disc becomes lodged in the aperture thereby preventing movement of the locking plate.

In an embodiment, the locking arrangement further comprises a cam member associated with the biased spindle whereby turning the cam results in the one or more rotating dials becoming uncoupled from their respective notched circular discs to allow the combination lock to be reset wherein the movement of the cam member be effected by accessing a cam screw associated with the cam member, the cam screw being located along an underside of the harness body to prevent the combination lock from being reset while the harness body is being worn by the animal.

In an embodiment, the dog harness includes the leash wherein the locking portion of the leash comprises an elongate locking pin adapted to be engaged by the clasps and the locking arrangement, the locking pin extending from a relatively wider stop member and terminating in a tip that is configurated to be inserted into a locking hole provided on the cover plate of the harness body, the stop member being configured to abut with a cover plate located on the harness body to limit the insertion depth of the locking portion.

In an embodiment, the harness body comprises: a back panel adapted to be located at or adjacent the animal's back region during use; a chest panel adapted to be located at or adjacent the animal's chest region during use; wherein in-use frontal portions of the back panel and chest panel are interconnected by a neck restraint loop to receive the animal's neck and wherein in-use rear portions of the back panel and chest panel are interconnected by the said pair of restraint loops adapted to pass respectively under the left and right foreleg pits of the dog; and wherein the fastening arrangement, the connector and the locking arrangement are located on the back panel.

In an embodiment, each restraint loop comprises a pair of restraint straps that are movable relative to each other for adjusting the overall length of the restraint loop such that: a first strap member, at a first end, is fixed to a first strap adjustment member and a second end of the first strap member is structured for attachment to the back panel or the chest panel; and a second strap member, at a first end, is fixed to a second strap adjustment member and a second end of the second strap member is structured for attachment to the back panel or the chest panel; wherein the first strap adjustment member further comprises a passage to allow a section of the second strap to be passed through and wherein the second strap adjustment member also comprises a passage to allow a section of the first strap to be passed through; characterised in that the first and second adjustment members can be moved towards or away from each other to adjust the overall length of the restraint loop.

In an embodiment, the second adjustment member comprises a ratchet mechanism for engaging a ratchet engaging surface provided on the first strap and resist movement of the first strap through the passage of the second adjustment member.

In an embodiment, the dog harness assembly further comprises a ratchet locking member configured to be located on an animal contacting surface of the adjustment member to prevent access when the harness assembly is worn by the animal.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1A:
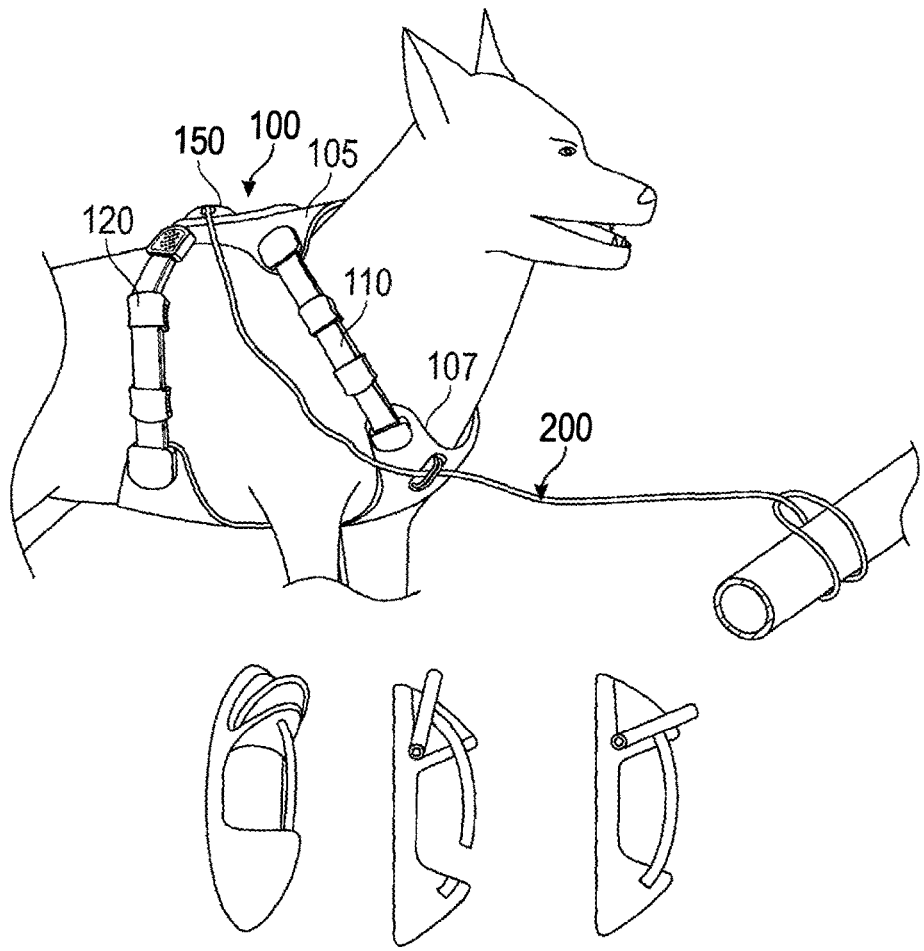
FIG. 1A is an in-use perspective view of a harness assembly 100 in combination with a leash 200 shown in a locked position in accordance with an embodiment.
Figure 1B:
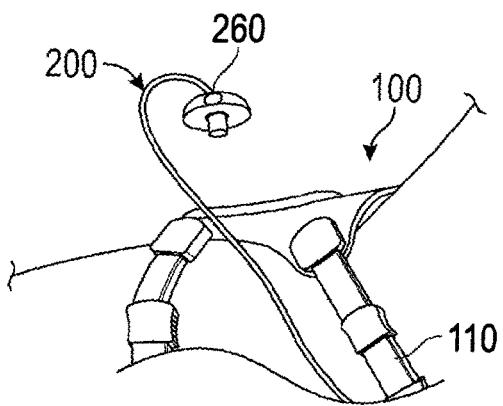
FIG. 1B is an in-use perspective view of harness assembly 100 in combination with a leash 200 shown in an unlocked position.
Figure 2:
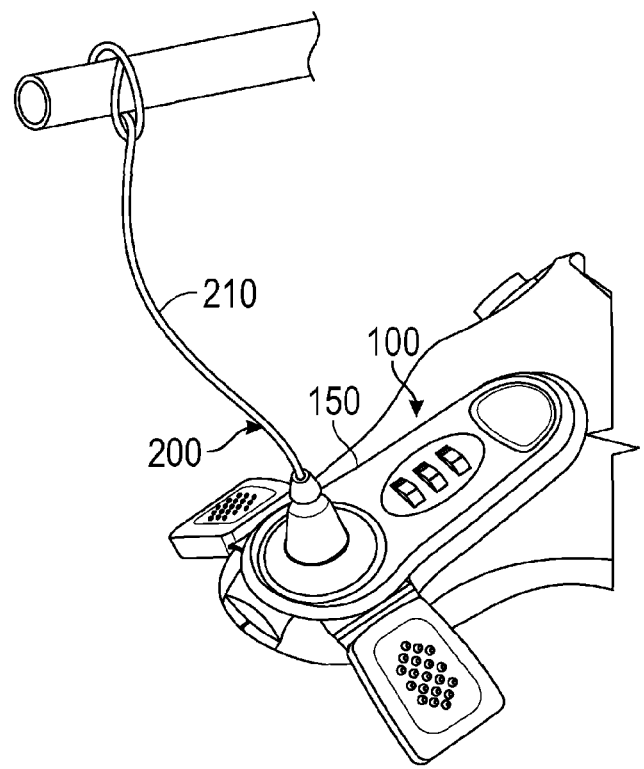
FIG. 2 is a top perspective view (enlarged) of the harness assembly 100 in combination with a leash 200 shown in a locked position in accordance with an embodiment.
Figure 3:
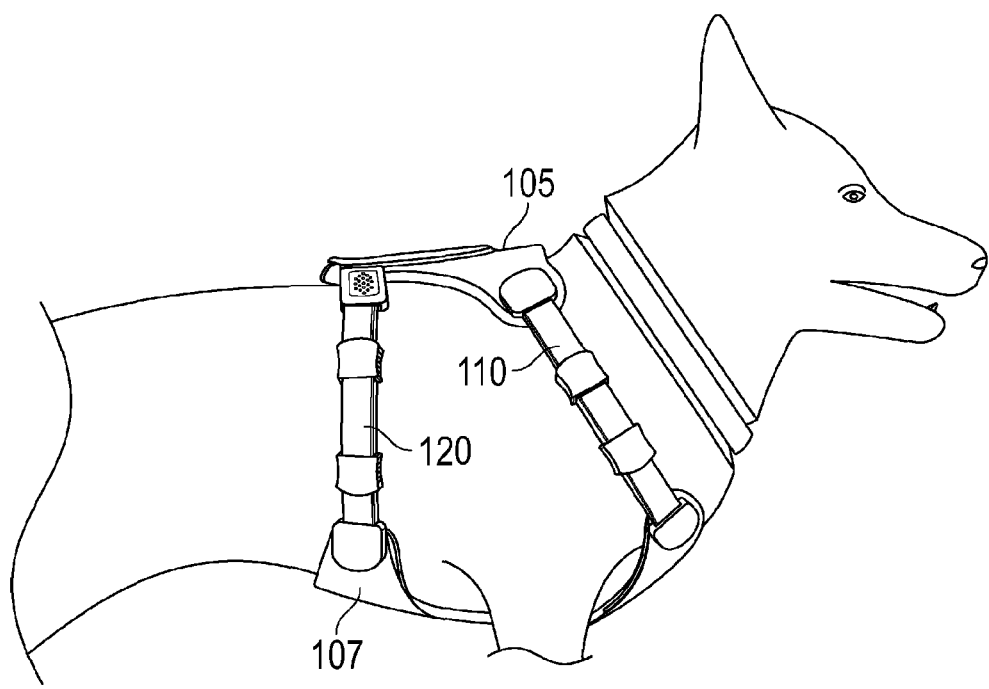
FIG. 3 is a side view of the harness assembly 100 worn by an animal without the leash 200.
Figure 4A:
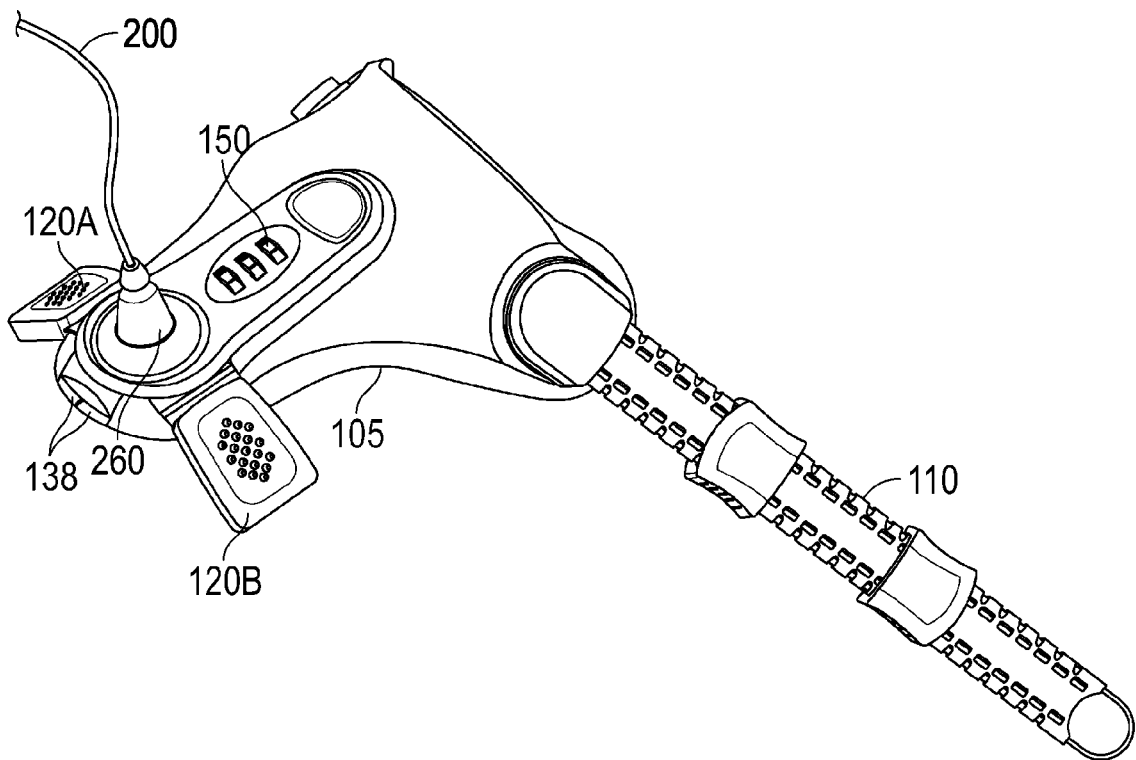
FIG. 4A is a top view of the harness assembly 100 in combination with the leash assembly 200 shown in a locked position.
Figure 4B:
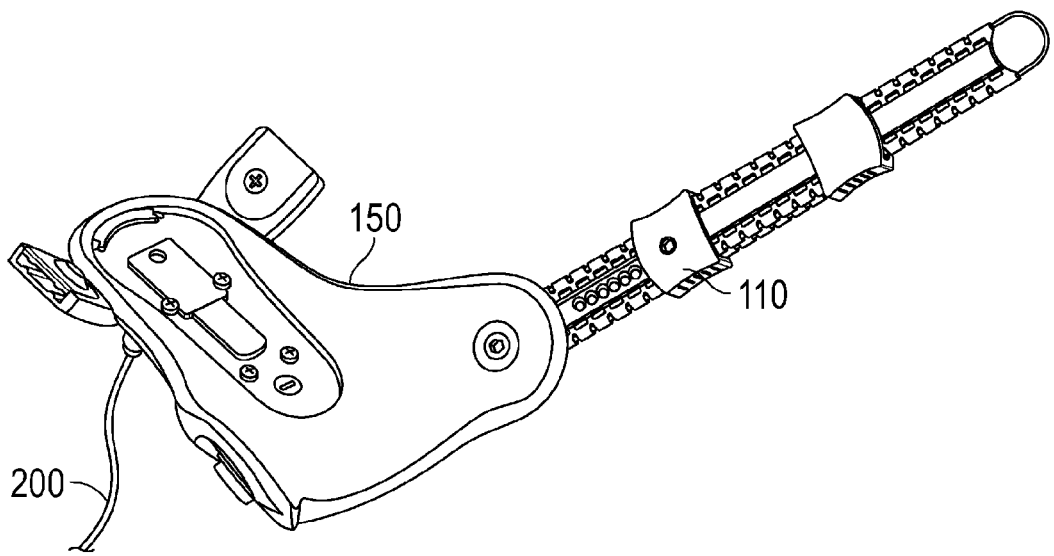
FIG. 4B is an underside view of the harness assembly 100.
Figure 5A:
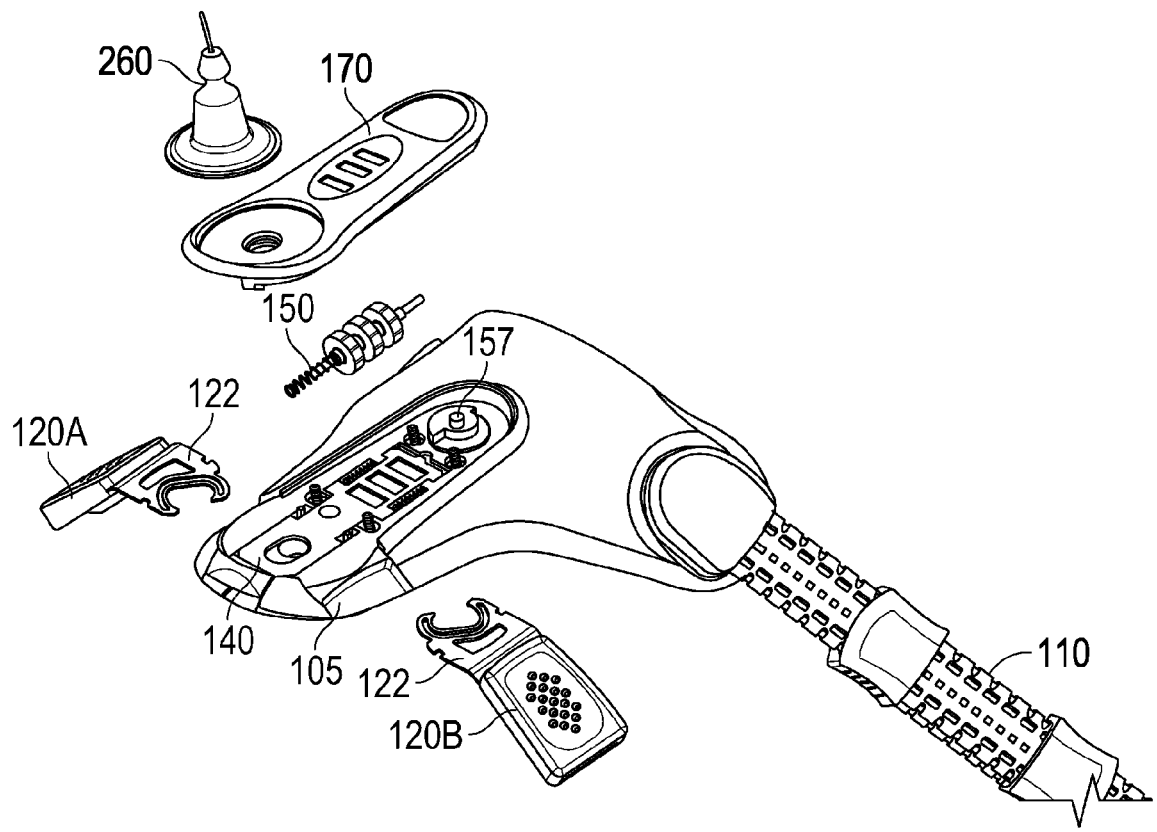
FIG. 5A is a partially exploded view of the harness assembly 100 and the leash connector 260.
Figure 5B:
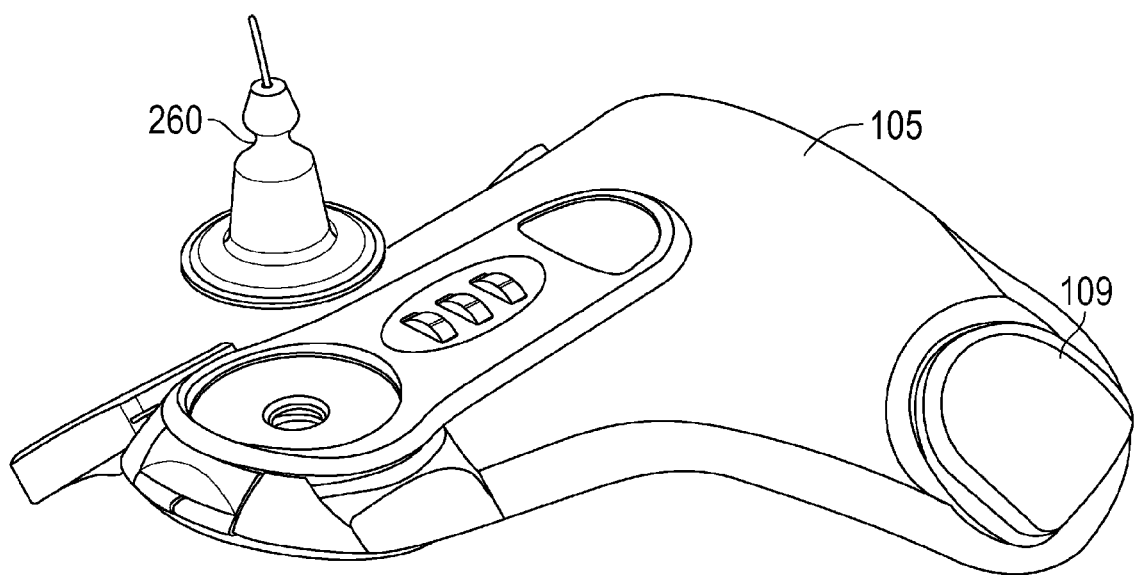
FIG. 5B shows a top perspective view of the of the harness assembly 100 and the leash connector 260 in an unlocked position.
Figure 6A:
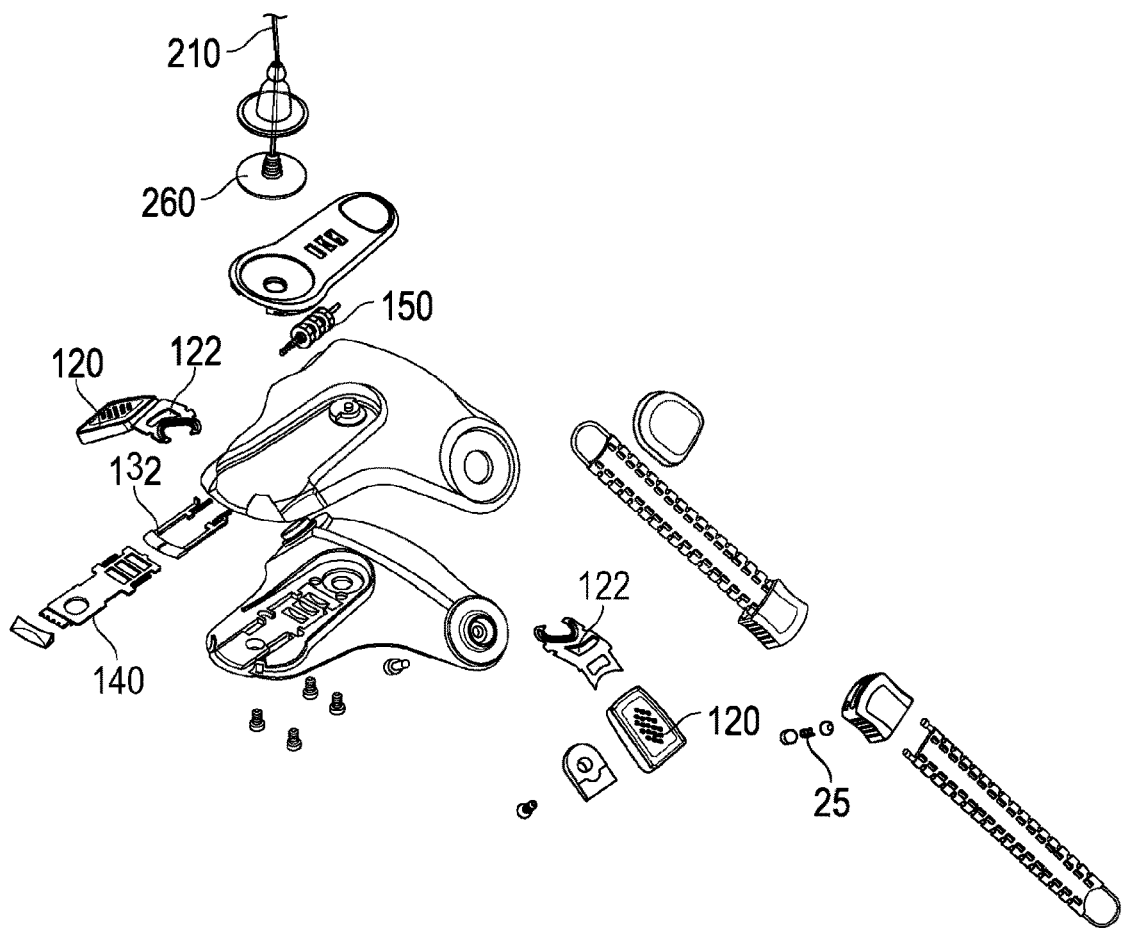
FIG. 6A is an exploded view (top) of the harness assembly 100 and leash connector 260.
Figure 6B:
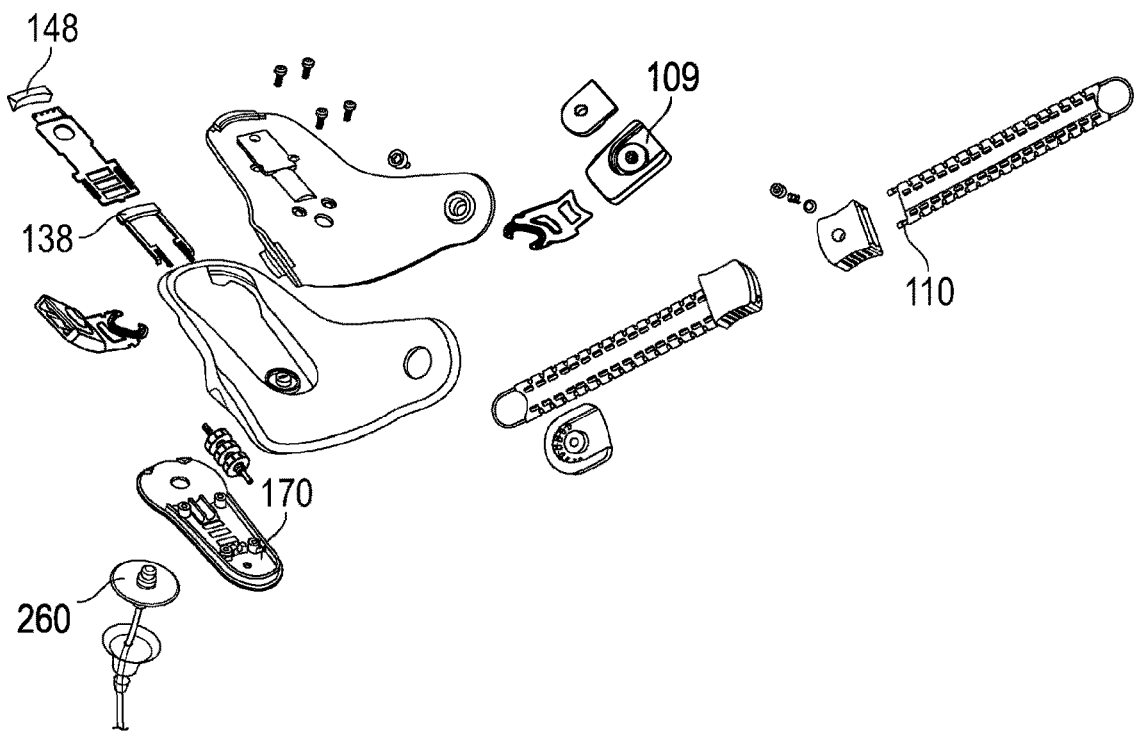
FIG. 6B is an exploded view (underside/bottom) of the harness assembly 100 and the leash connector 260.
Figure 7:
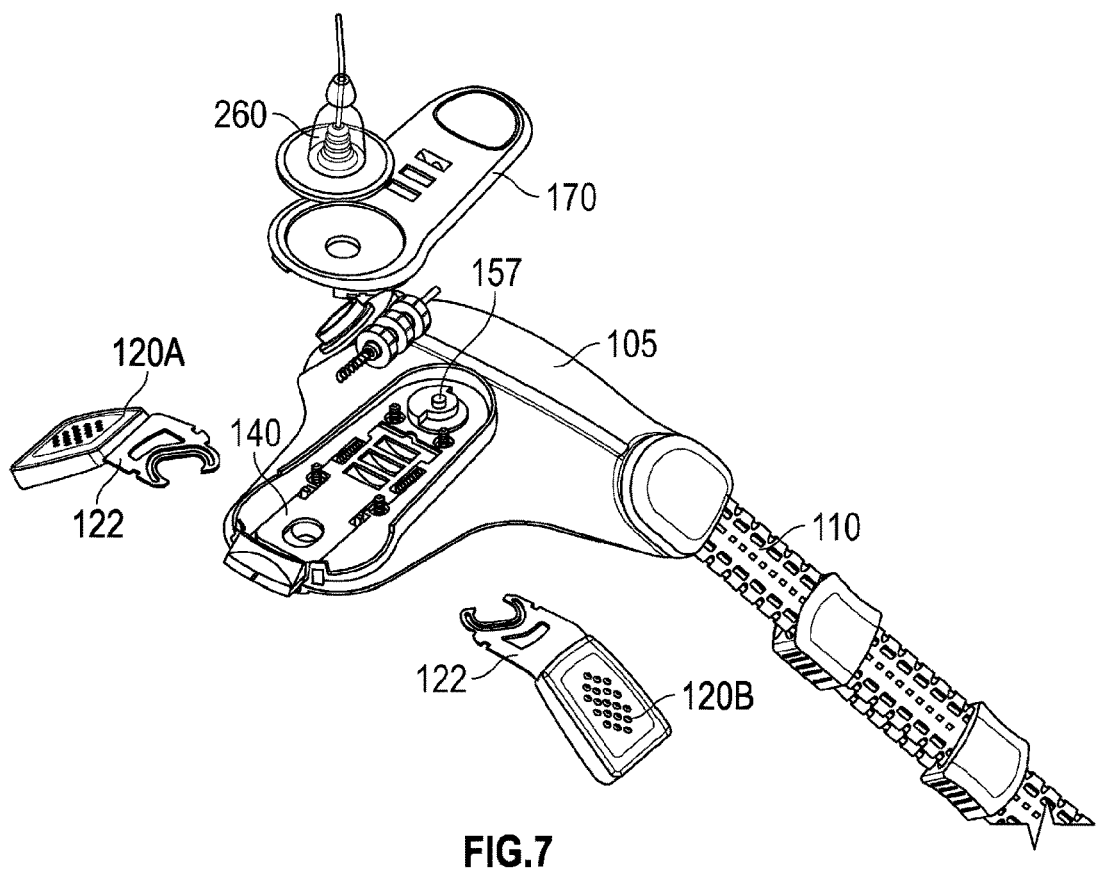
FIG. 7 is a top view (partially exploded) of the harness assembly 100 showing the internal components of the locking plate 140 that engages the leash connector 260.

FIGS. 1 to 19 illustrate a harness and lead assembly 100 and 200 respectively that is suitable for preventing dog theft by allowing a dog owner to tie up their dog securely at any location while carrying out errands such as shopping. FIGS. 1A and 2 show in-use views of the harness assembly 100 and leash assembly 200. FIG. 1A shows a locked configuration whereby the leash assembly 200 can be connected and securely locked to the harness assembly 200 via a novel locking arrangement 150. FIG. 1A shows the leash assembly 200 in a locked configuration relative to the harness assembly 100. FIG. 1B shows the leash assembly 200 in an unlocked configuration relative to the harness assembly 100.

The harness assembly 100 comprises an adjustable neck restraint loop 110 adapted to surround a neck portion of a dog (as shown in FIG. 1A). The harness assembly 100 also includes a pair of restraint loops 120A and 120B (denoted generally by reference numeral 120) adapted to pass respectively under the left and right foreleg pits of the dog. The harness assembly 100 includes a back panel 105 and a chest panel 107 which are interconnected by the neck restraint loop 110 and the rear restraint loops 120. The neck restraint loop 110 comprises an adjustment mechanism (described in greater detail in the foregoing sections) for adjusting the overall in-use length for each of the neck restraint loops 110A and 110B. For each of the neck restraint loops (110A and 110B) a first end of each neck restraint loop is permanently and securely attached to a respective frontal corner portion of the back panel 105 via an articulating connection 109 and a second end of each neck restraint loop is also attached to a respective frontal corner portion of the chest panel 107 via an articulating connection 109. The articulating connections 109 allow the neck straps 110 to move in a forward or rearward direction relative to the back panel 105 and the chest panel 107 during use thereby improving the level of comfort provided to the animal.

Each rear loop 120A and 120B is adapted to be releasably fastened to a fastening arrangement provided on the back panel 105 of the harness assembly 100. In the preferred embodiment, the fastening arrangement comprises a pair of fasteners in the form of spring loaded retainers 132A and 132B (generally denoted by the reference numeral 132) for fastening and retaining respective clasps 122A and 122B (generally denoted by the reference numeral 122) provided at the end portion of the each rear loop strap 120A and 120B.

Figure 8:
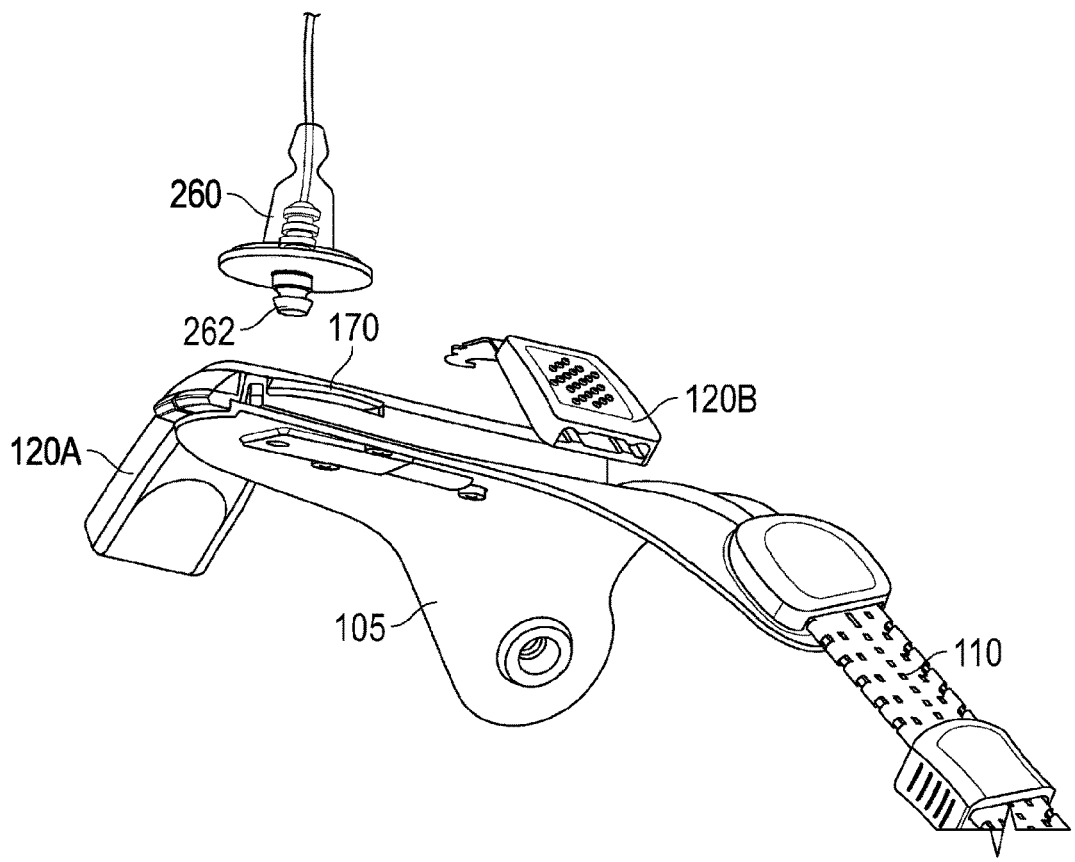
FIG. 8 is an underside view (partially exploded) of the harness assembly 100.
Figure 9:
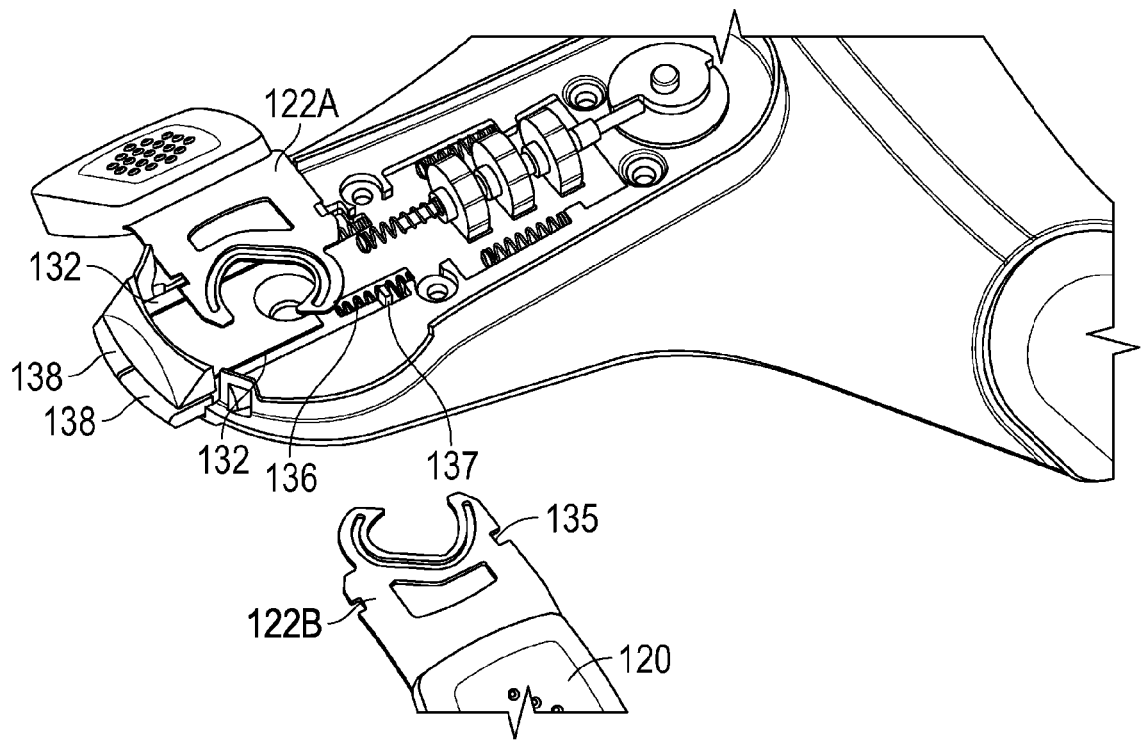
FIG. 9 is an internal view of the fastening arrangement comprising spring loaded retainers 132 used for retaining clasps 122 whereby only one clasp 122A has been fastened.
Figure 10:
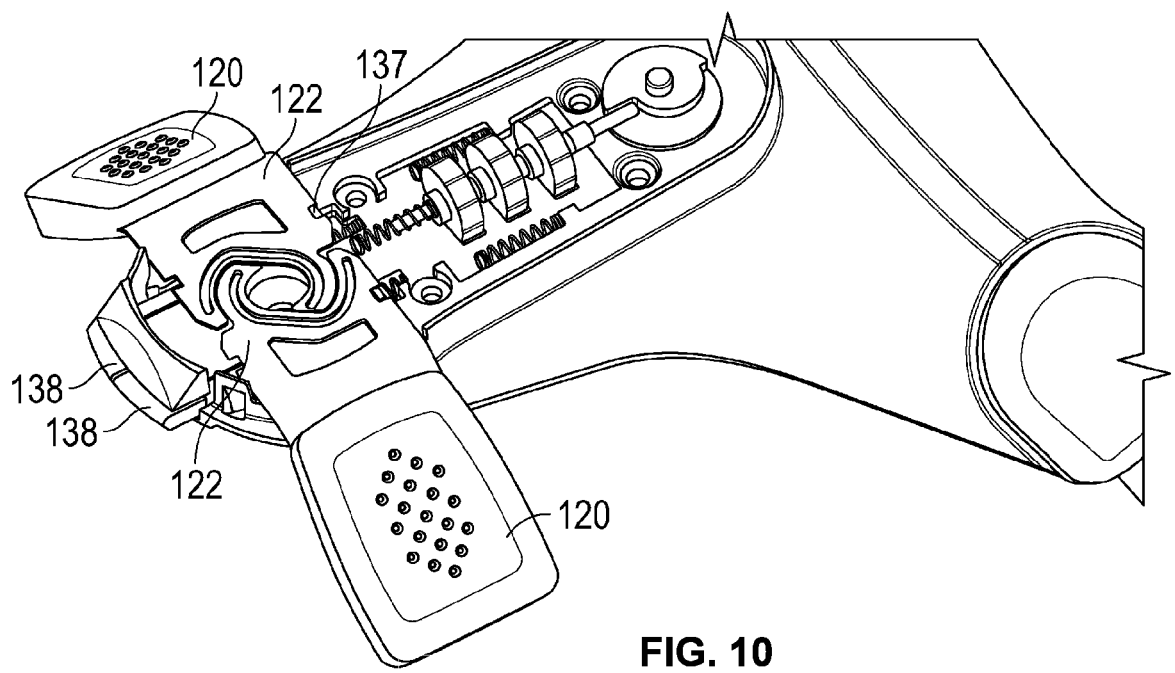
FIG. 10 is an internal view of the fastening arrangement comprising spring loaded retainers 132 used for retaining clasps 122 whereby both clasps 122 have been fastened.
Figure 11:
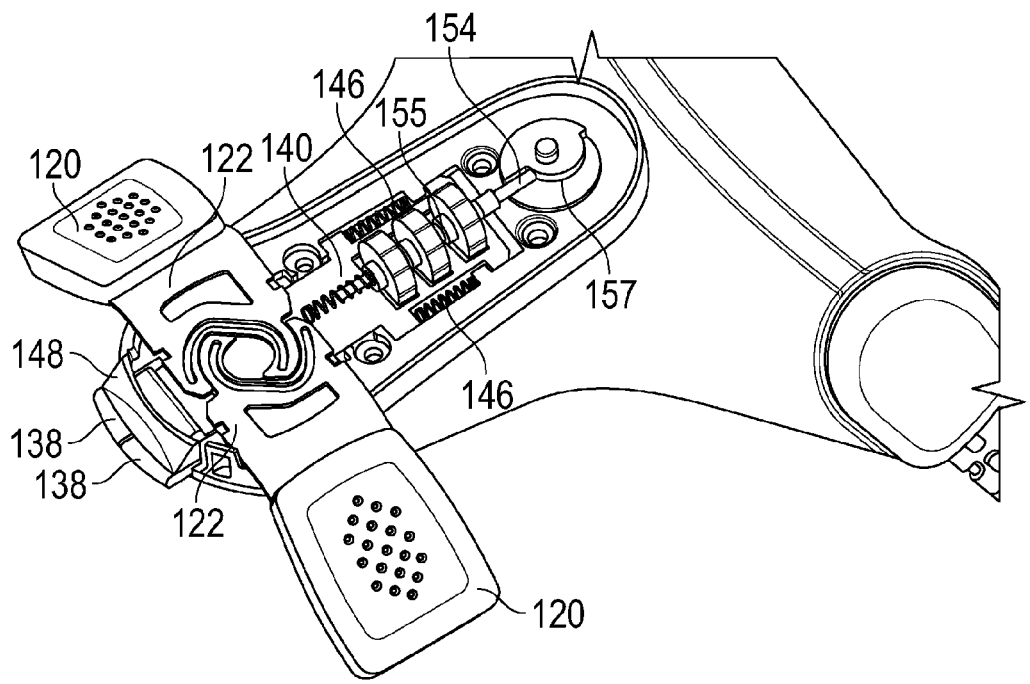
FIG. 11 shows an internal view of the fastening arrangement with the locking plate 140 being positioned above the spring-loaded retainers 132 to engage with the locking portion 262 of the leash connector 260.
Figure 12:
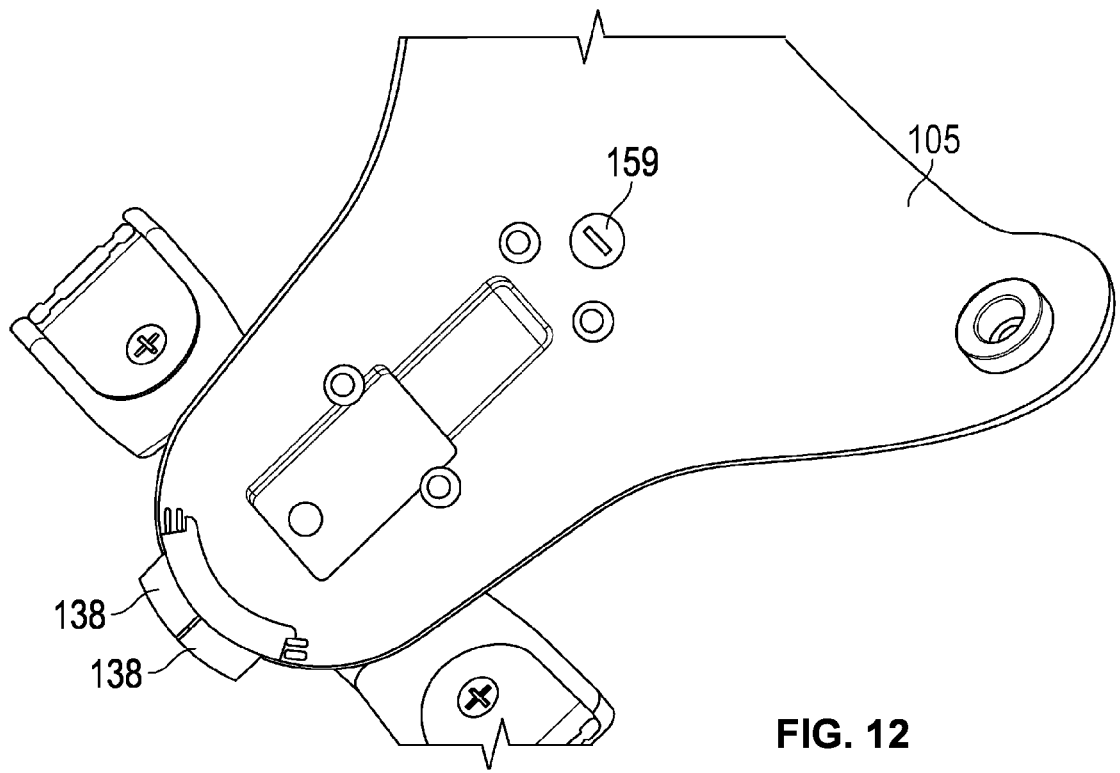
FIG. 12 shows an underside view of the back panel 10S including a cam screw 159
Figure 13:
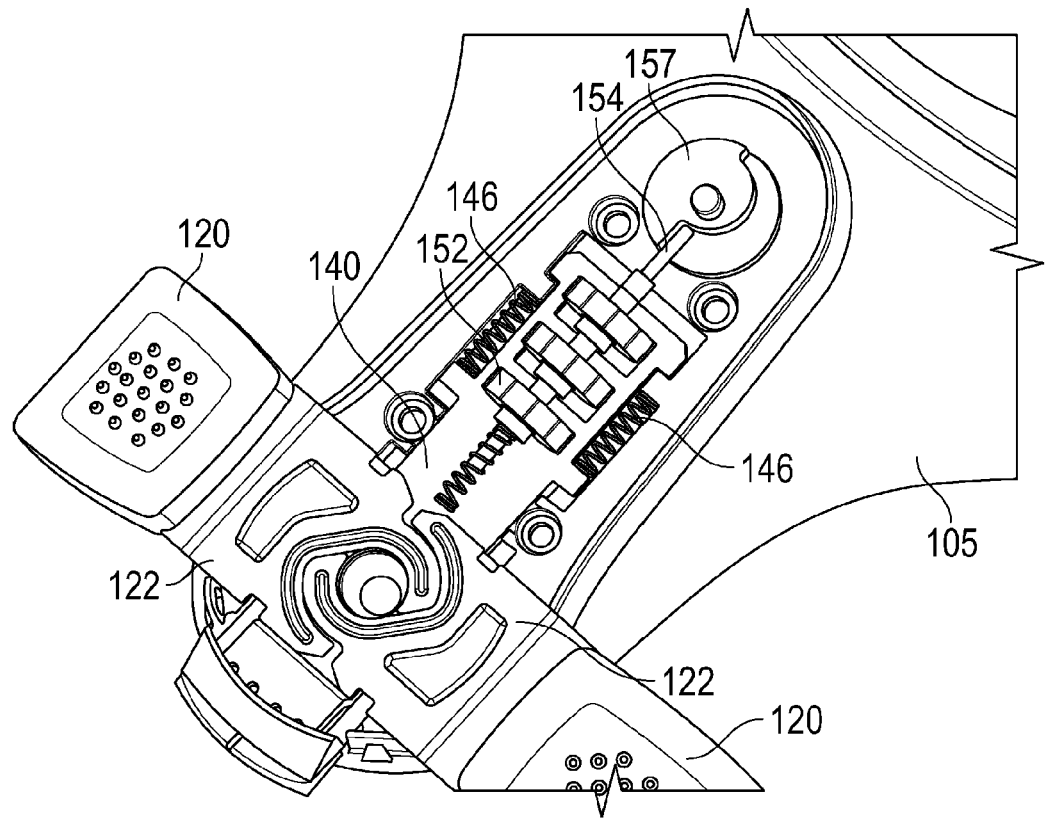
FIG. 13 is an enlarged internal view of the locking arrangement 150 and the locking plate 140 (the locking plate 140 being shown in a pushed or open position).
Figure 14:
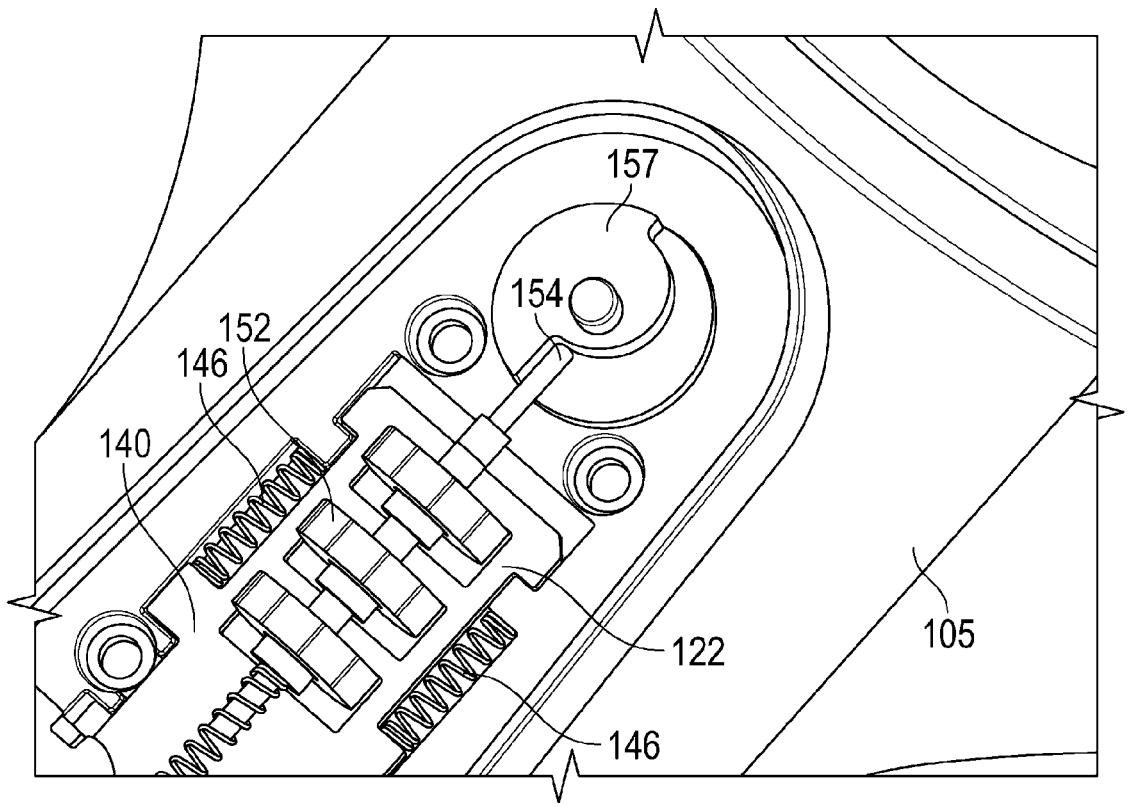
FIG. 14 is an enlarged view of the locking arrangement 150 and the locking plate 140 (the locking plate 140 being shown in a locked position).

Referring to FIGS. 8 to 10 in particular, it is clearly shown that the spring loaded retainers 132A and 132B are positioned in a recessed channel provided within a moulded section of the back panel 105. Each spring-loaded retainer 132A and 132B includes a notch 137 that is structured to be received into a detent 135 provided along a peripheral portion of a respective clasp member 122. In an in-use fastened position, the bias applied by the respective springs 136 on each spring loaded retainer 132 pushes the notch 137 into the detent provided on the clasp 122 resulting in each clasp 122 remaining secured to the back panel 105 until a user pushes tabs 138 to push one or both of the spring loaded retainers 132 in an axial direction by overcoming the biasing force of the springs 136 to release the notch 137 out of the detent thereby releasing the clasp 122 from the back panel 105 of the harness assembly 100.

Each of the clasps 122 are also structured to mutually co-operate in the locked configuration (shown in FIGS. 10 and 11) to define a through hole that can receive a leash connector 260 that forms part of the leash assembly 200. The harness also includes a locking plate 140 (See FIG. 11) that is adapted to be securely locked with the leash connector 260. In the preferred embodiment, the leash connector 260 includes a locking pin 262 (shown in FIGS. 16 and 17) that is suitably configured to be received into the through hole defined by the clasps 122 in the locked configuration. The locking plate 140 is biased by spring members 146 to push locking portions of the locking plate 140 into engagement with a detent 263 provided on the locking pin 262. A user may release the locking pin 262 from the harness assembly 100 by pushing a tab 148 that is operatively linked with the locking plate 140 such that the pushing of the tab 148 with sufficient force overcomes the bias applied by springs 146 and moves the locking portion of the locking plate 140 out of engagement with the detent of the locking pin 262 (See FIG. 13 that shows the locking plate 140 in a pushed position). The configuration of the locking plate 140 and the locking pin 262 of the leash connector 260 allow the locking pin 262 to undergo rotation within the through hole defined by the clasps 122 thereby providing an articulating joint or connection between the leash assembly 200 and the harness assembly 100.

The connection between the leash assembly 200 and the harness assembly 100 is further secured by a locking arrangement 150 that can be actuated to prevent the movement of the locking plate 140 and thereby prevent the locking pin 262 from being released from the harness assembly 100. It is also important to note that in the locked configuration, the clasps 122 cannot be uncoupled from each other because the claw like shape of each clasp 122 wraps around the body of the locking pin 262. Unless, the locking pin 262 is withdrawn from the through hole defined by the clasps 122, the clasps cannot be released from the fastening mechanism even if tabs 138 are pushed to axially move the spring-loaded retainers 132.

In the preferred embodiment, the locking arrangement 150 comprises a combination lock with three rotating dials or wheels 152 mounted on a spring-loaded lock spindle 154. Each rotating lock wheel 152 of the locking arrangement 150 is associated with a notched circular disc 155 such that rotation of the wheel 152 along the spindle 154 results in rotation of the notched disc 155 associated with the rotated wheel 152. The locking plate 140 includes corresponding apertures that are sufficiently sized to receive each of the locking wheels 152 and the associated notched disc 155. The locking arrangement 150 allows a user to enter the correct lock combination which positions the notch for each notched disc 155 within the aperture of the locking plate 140 which in turn allows the locking plate to be pushed (as explained earlier by pushing the tab 148). In the locked position, the disc portion of the notched discs 155 become lodged within the apertures of the locking plate 140 thereby preventing any movement of the locking plate 140 and consequently preventing the locking pin 262 of the leash assembly 200 from becoming uncoupled from the harness assembly 100. The locking arrangement 150 also includes a cam 157 associated with the spring-loaded spindle 154 which can be used for re-setting the combination lock of the locking arrangement 150. The cam 157 may be moved by accessing a cam screw 159 provided on the underside of the harness back panel 105 (See FIG. 12) which in turn allows each locking wheel 152 to be uncoupled from the notched disc 155 whilst the lock is in an open position and allows the opening combination to be reset in a manner as known from conventional combination locks. The location of the cam screw 159 prevents unauthorised persons from resetting the locking combination. As a result, when the harness 100 is worn by the animal, it is impossible to access the cam screw 159 when the locking arrangement 150 is in a locked configuration.

Figure 15A:
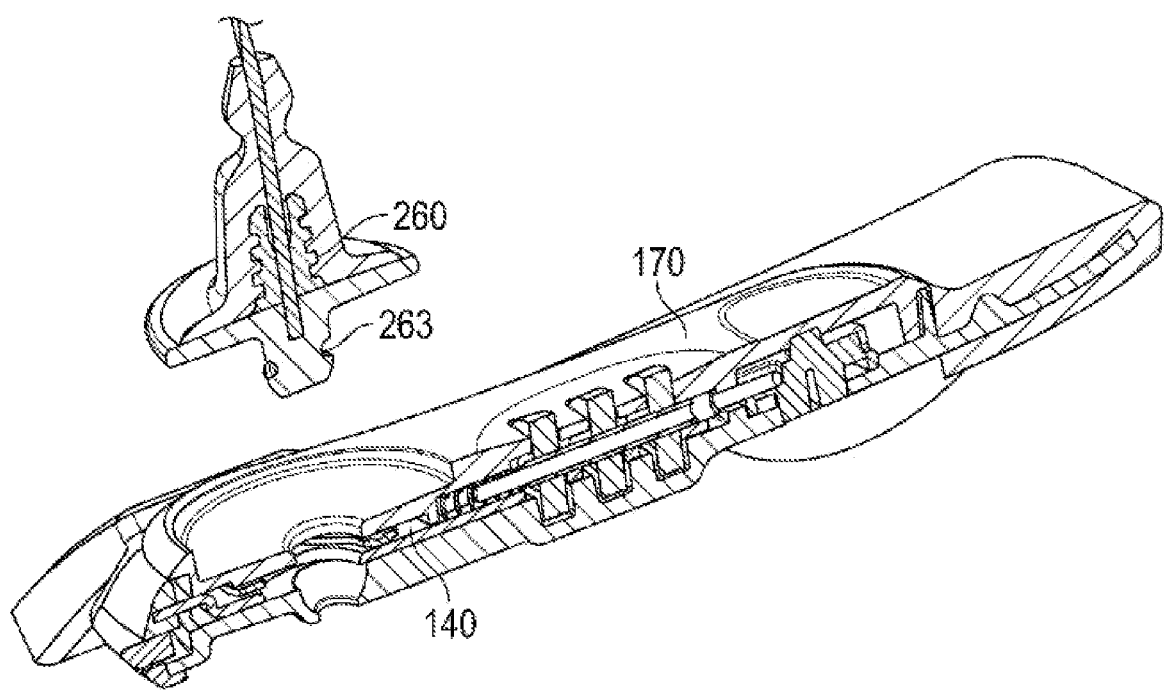
FIG. 15A is a sectional view of the locking arrangement 150 including the locking plate 140 (when the leash connector 260 has not been locked).
Figure 15B:
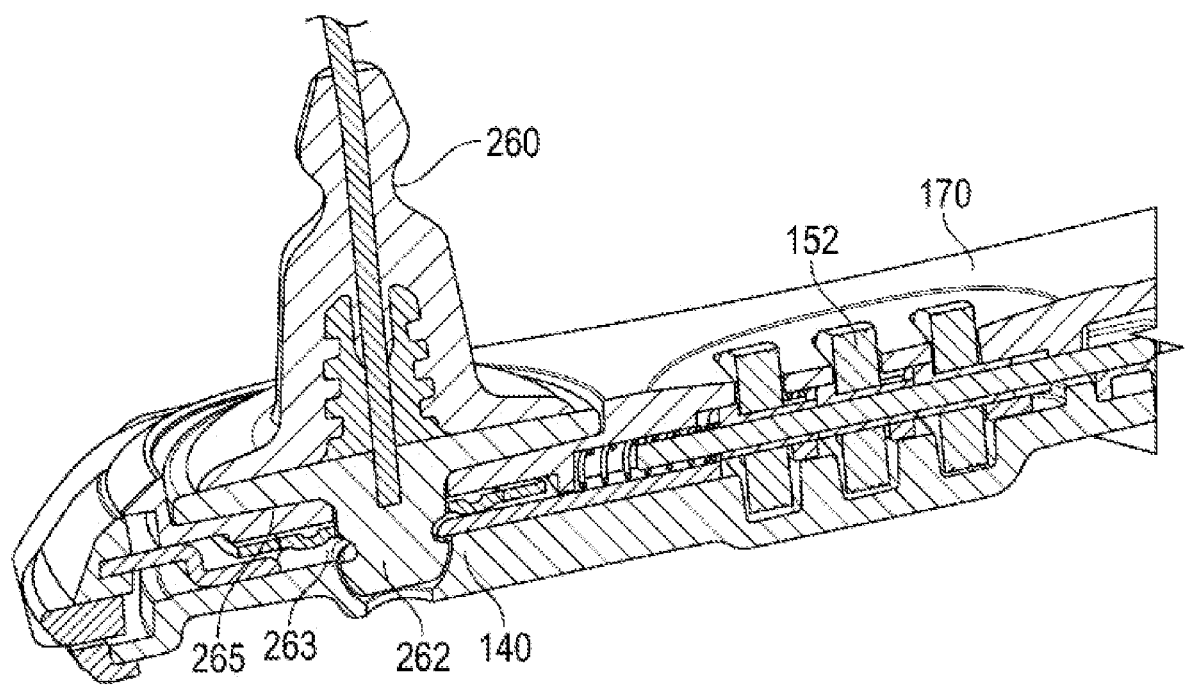
FIG. 15B is a sectional view of the locking arrangement 150 including the locking plate 140 (when the leash connector 260 has been inserted and locked).
Figure 16A:
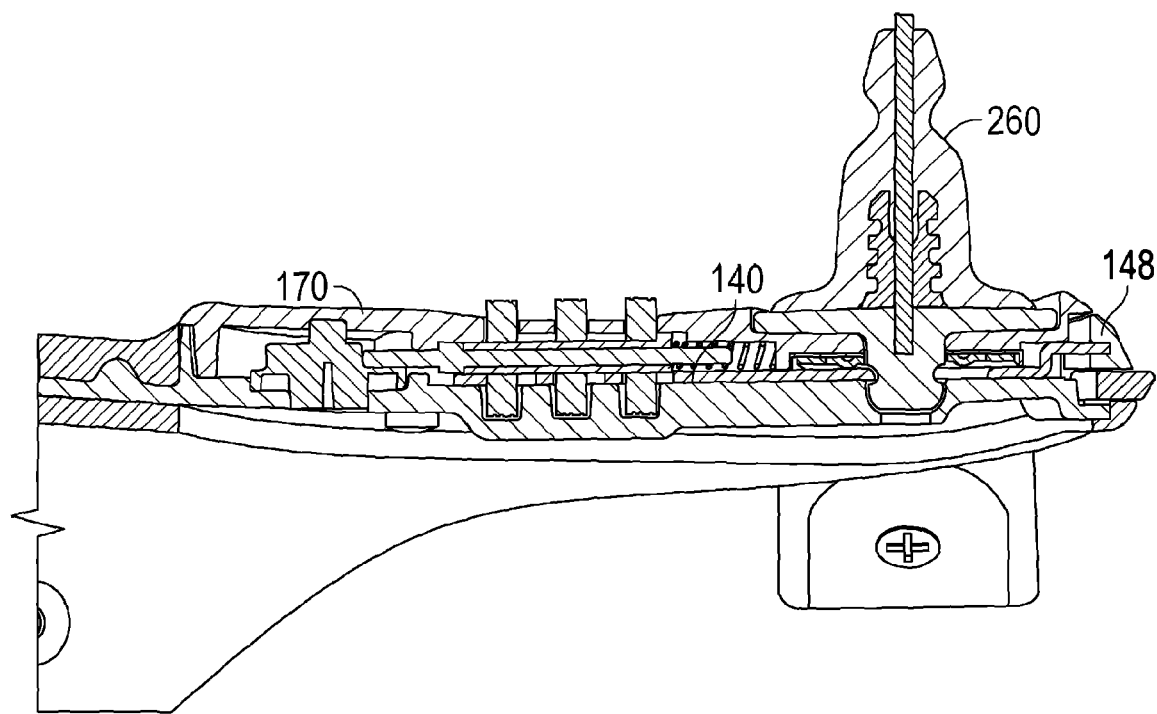
FIG. 16A shows the locking plate 140 in a locked position.
Figure 16B:
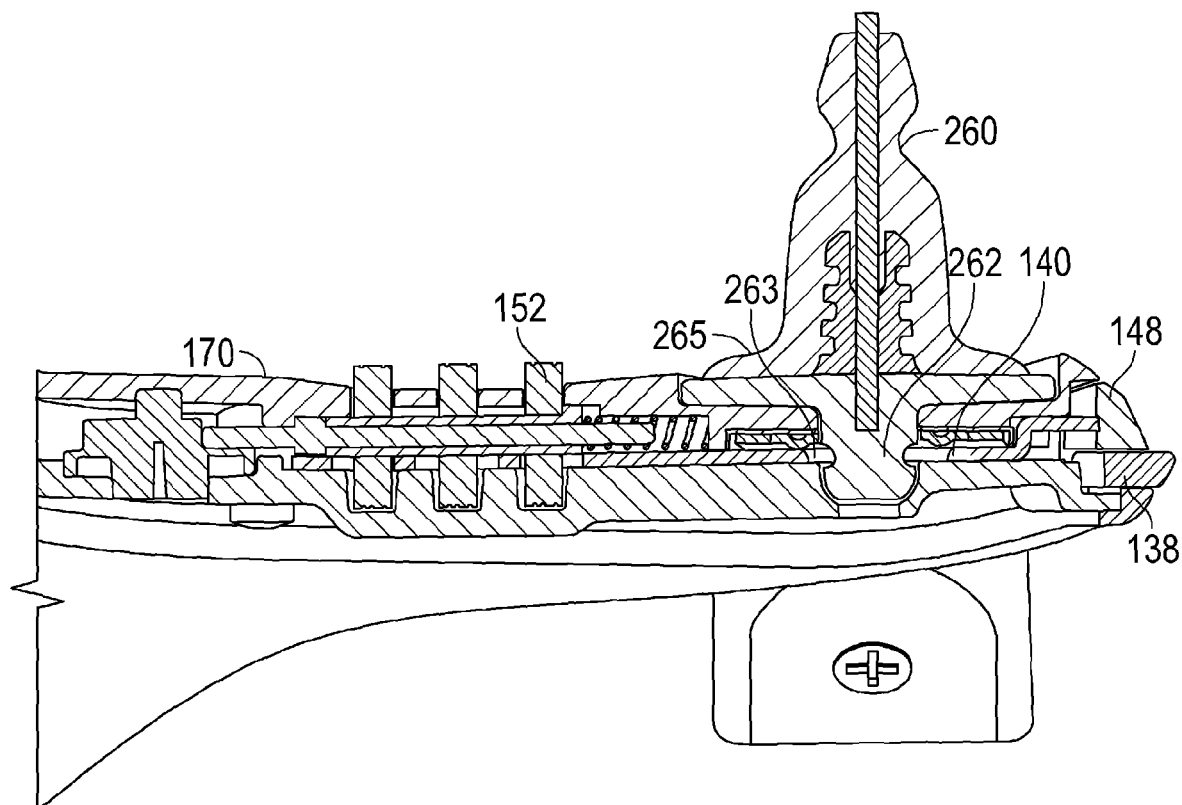
FIG. 16B shows the locking plate 140 in an unlocked position (as the locking plate has been pushed into the open position by pressing on tab 148).
Figure 17A:
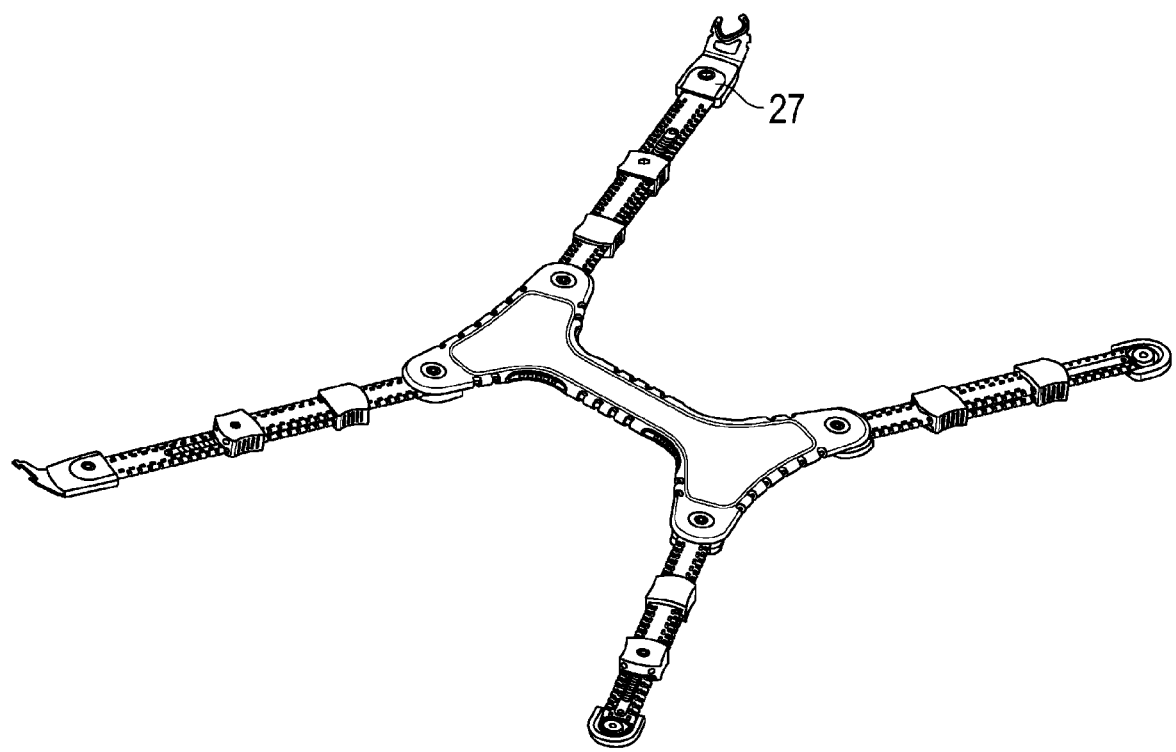
FIGS. 17A to 17D show various views of the chest panel 107.
Figure 17B:
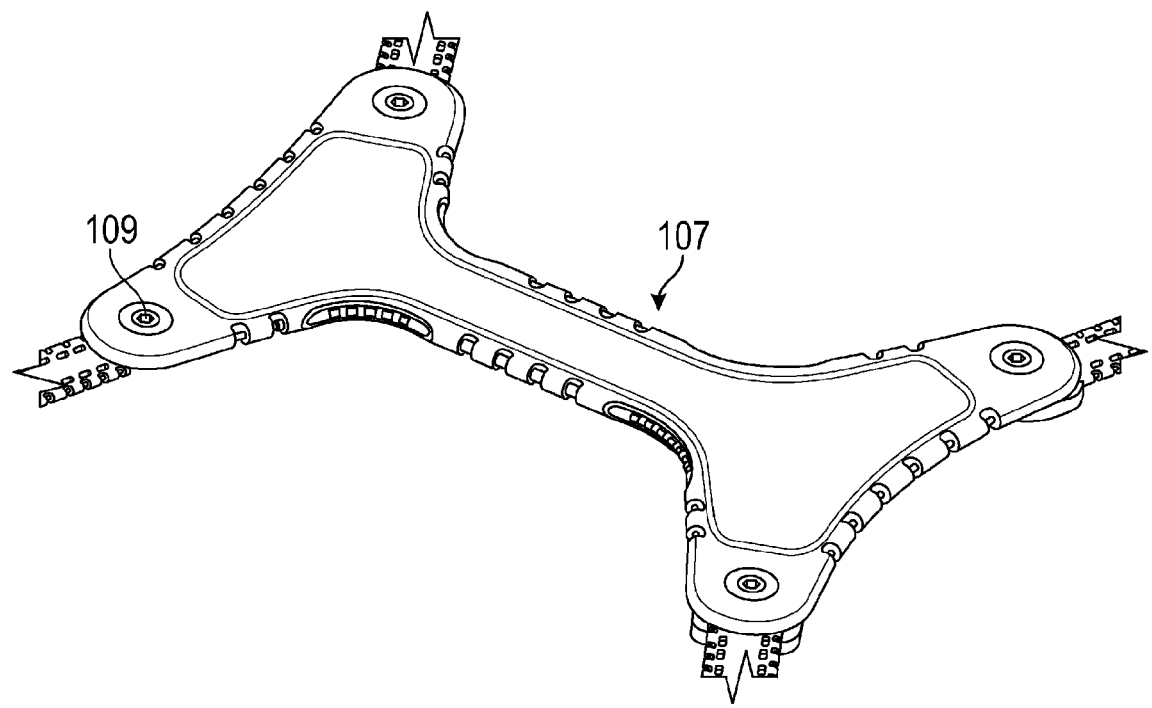
Figure 17C:
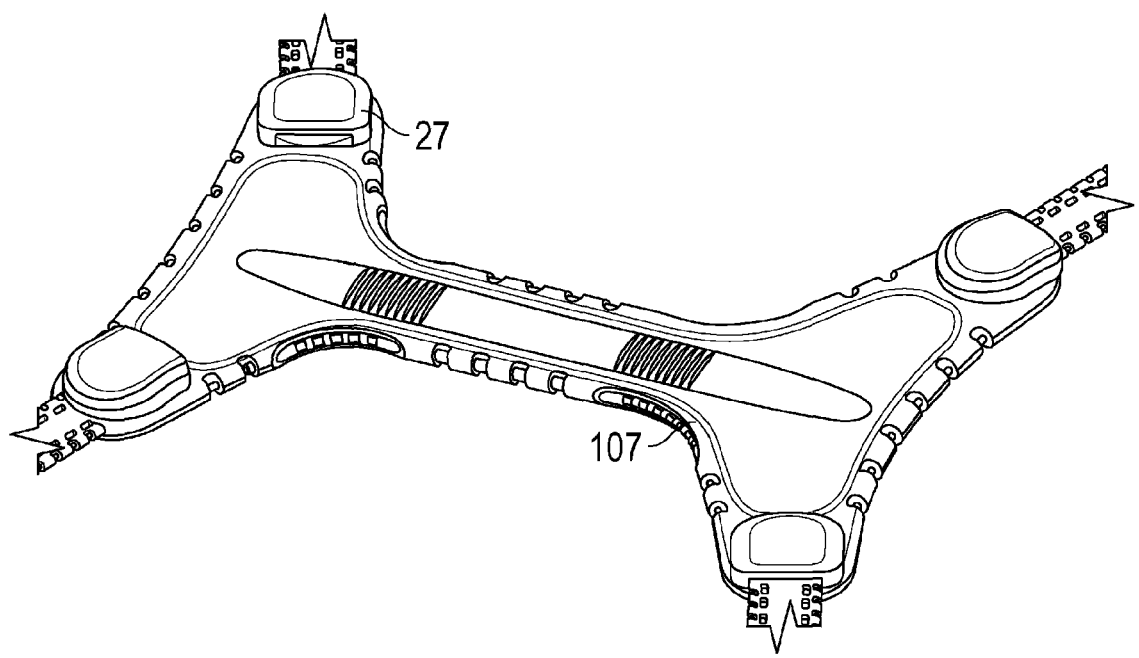
Figure 17D:
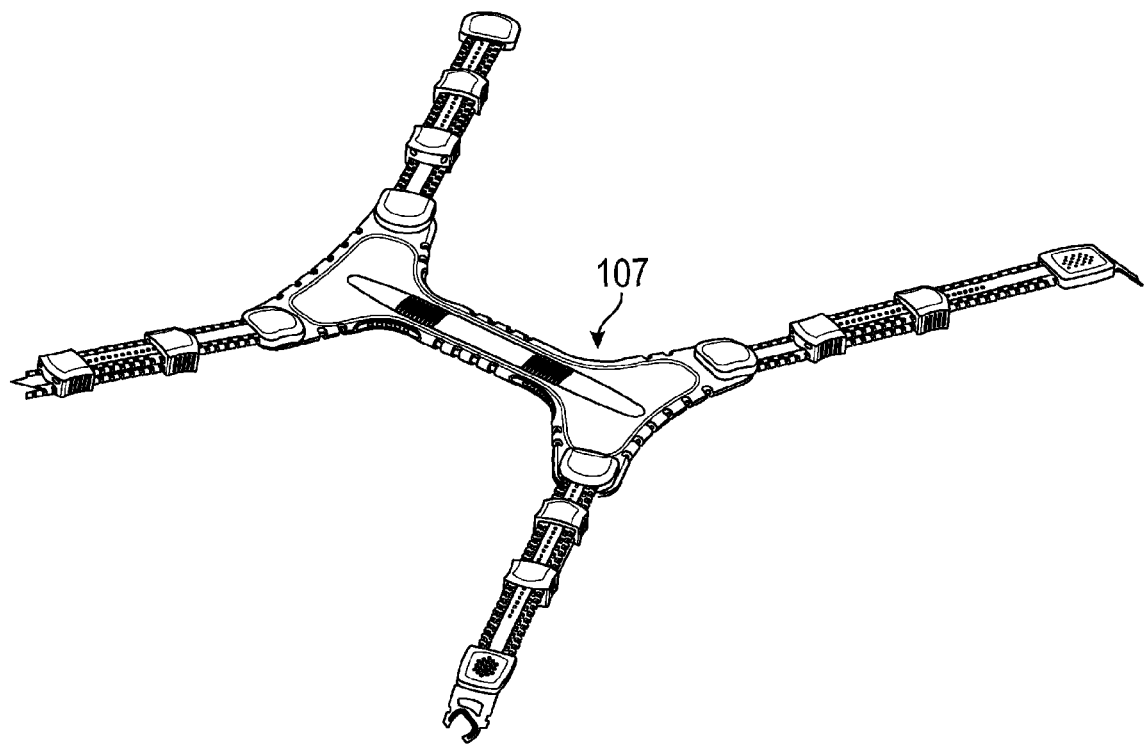

Referring to FIGS. 15A and 15B, the leash connector 260 includes a widened strike plate 265 that abuts a cover plate 170 located on the back panel 105 of the harness assembly when the locking pin 262 is received into the locking hole provided on the back panel 105 of the harness assembly 100. The widened configuration of the strike plate 265 functions as a stopping member and limits the inward movement of the locking pin 262 and assists with stabilising the locking pin 262 in the locked configuration.

The locking arrangement 150 in combination with spring loaded retainers 132 and the clasps 122 provide a novel locking arrangement that prevents restraint loops 120A and 120B from being unfastened from the harness body 110 when the locking arrangement 150 is in a locked configuration with the locking pin 262 of the leash connector 260. However, during periods of non-use, the arrangement allows the clasps 122 for each rear restraint 122 to be easily uncoupled individually by utilising each indivisual release tab 138. The provision of the locking arrangement within a recessed portion of the back panel 105 of the harness assembly 100 also makes tampering with the locking arrangement more difficult for any unauthorised users.

The leash assembly 200 may typically comprise a leash 210 (preferably comprising wrapped metallic wire) with a closed loop being provided at one end (See FIGS. 1 and 2) and the leash connector 260 being provided at the other end so that the leash connector 260 is passed through the loop and pulled to secure the leash to a stationary body such as a concrete pillar.

Figure 18A:
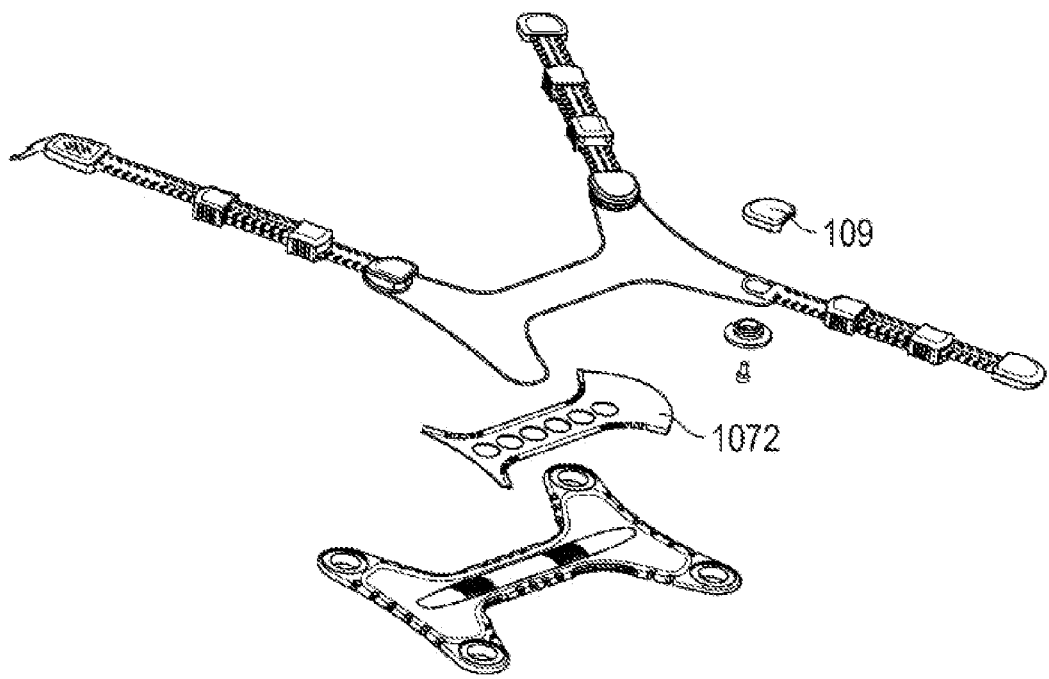
FIGS. 18A to 18B show various internal views of the chest panel 107.
Figure 18B:
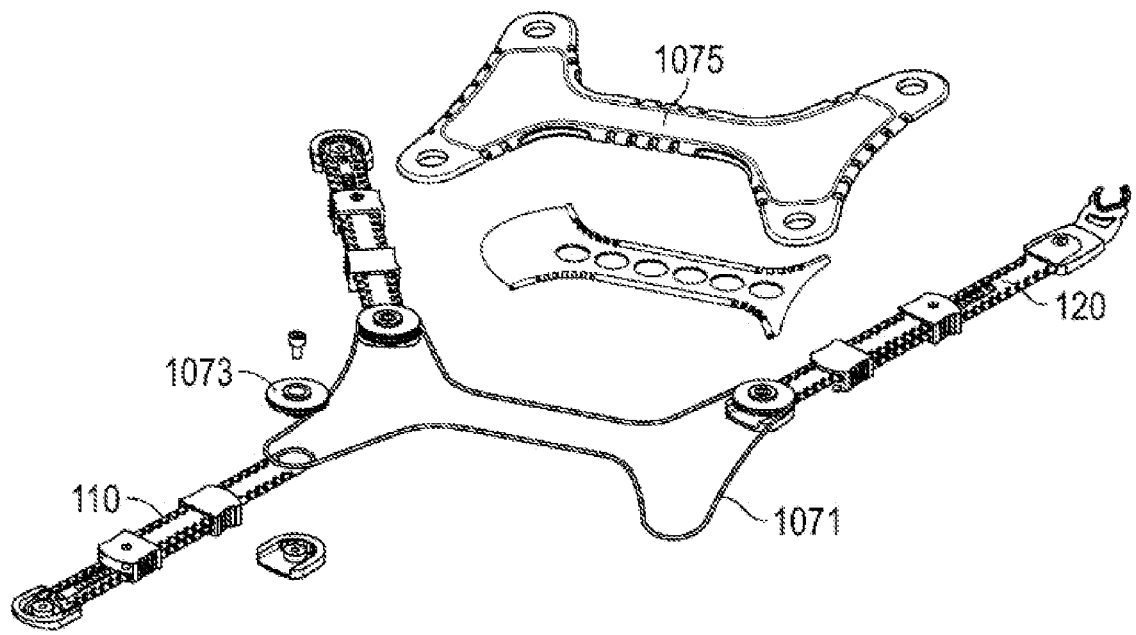
Figure 19A:
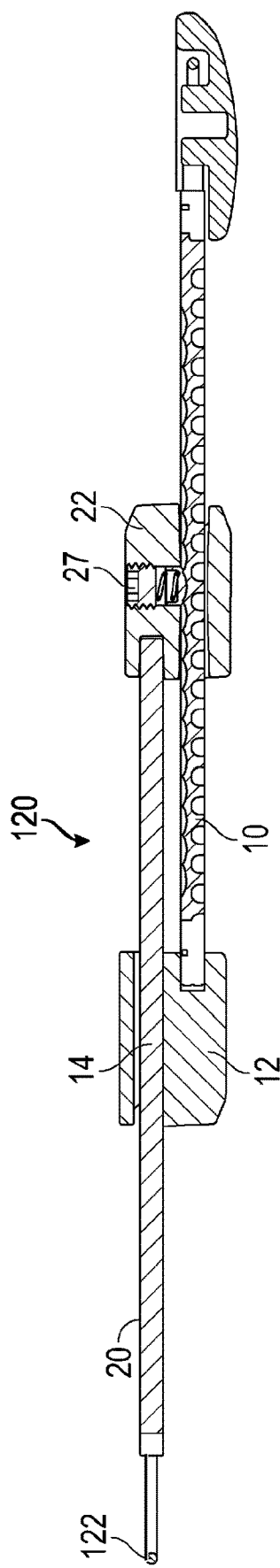
FIG. 19A is a sectional view of the restraint loop assembly 120 comprising straps 10 and 20 and strap adjusters 12 and 22.
Figure 19B:
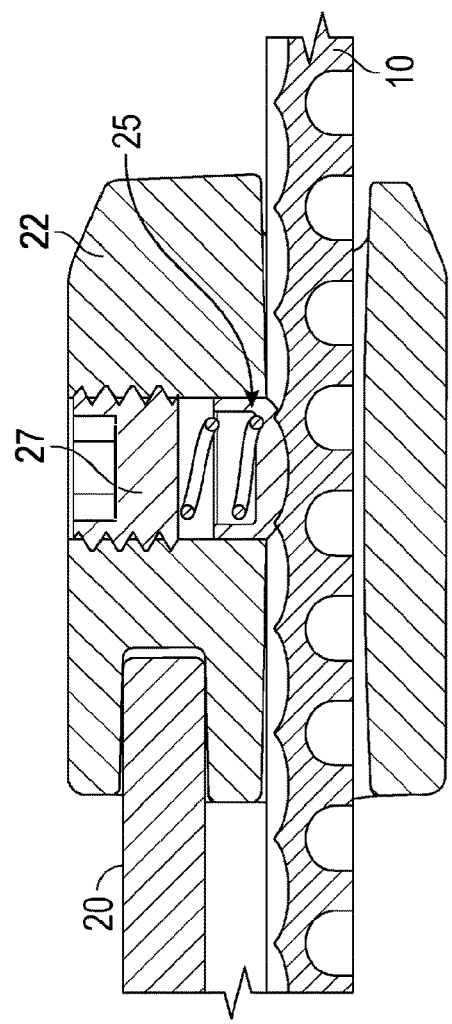
FIG. 19B is an enlarged sectional view of the strap adjuster 22.

Each of the restraint straps 110 and 120 are provided with a novel length adjustment arrangement best shown in FIGS. 17 to 19. For the sake of explanation, the length adjustment arrangement will be explained with reference to strap members 10 and 20 that are movable relative to each other and when combined can be used to provide the restraint straps 110 and/or 120. Referring to FIGS. 19A and 19B, the first strap member 10 is fixed to a first strap adjustment member 12 at a first end. The second end of the strap 10 can be attached to the back panel 105 or the chest panel 107 of the harness assembly 100. Similarly, the second strap member 20 is fixed to a second strap adjustment member 22 at a first end and the second end of the strap 20 can be attached to the back panel 105 or the chest panel 107 of the harness assembly 100 in a manner as has been previously described. The first strap adjust member 12 also includes a channel or passage 14 to allow a section of the second strap 20 to be passed through. Similarly, the second strap adjust member 22 also includes a channel or passage 14 to allow a section of the first strap 10 to be passed through. A combination of the two adjust members 12 and 22 can be used to control the extent of overlap between the two strap members 10 and 20. As a result, movement of the two adjustment members 12 and 22 towards each other increases the overall length of the strap assembly comprised of the straps 10 and 20. Similarly, movement of the adjustment members 12 and 22 away from each other results in a decrease in the overall length of the strap assembly. The second adjustment member 22 also comprises a spring-loaded ratchet mechanism 25 to engage with a ratchet engaging surface provided on the first strap 10. Once the length of the strap assembly has been suitably adjusted, a locking member 27 may be used to maintain the ratchet mechanism 25 in an engaged position and lock the ratchet to prevent any further adjustment of the length of the strap assembly. The location of the locking member 27 is configured such that during use, the locking member 27 is only accessible from an underside of the neck restraint or rear restraint strap assemblies 110 or 120.

Advantageously, the harness assembly 100, mainly the back panel 105 and the chest panel 107 comprises a multilayer configuration including a metallic wire frame (as shown in FIG. 18) for reinforcing the chest panel 107. The chest panel 107 includes a wire frame 1071 with a flexible retainer 1072 to retain the wire frame 1071 and a flexible polyurethane panel 1075 overlaid on the retainer 1072 to form the chest panel 107. The straps forming the neck loop restraint 110 and the rear loop restraint 120 also include metallic wire ropes to improve resistance to tampering. Rigid discs 1073 are located at corner portions of the chest panel 107. The outer portion of the discs 1075 include a groove to allow the wire frame 1071 to pass through. The discs 1073 also include a central mounting aperture for movably attaching respective ends of the neck restraint straps 110A, 110B and rear restraint straps 120A and 120B to allow articulation of the straps relative to the chest panel. The discs 1073 may be covered with a cap member to prevent any tampering.

Turning to FIGS. 18A and 18B, the chest panel 107 comprises a frame comprising a wire rope 1071 that is held in a tensioned configuration around wire retaining discs 1073 with a flexible retainer 1072 to retain the wire frame 1071. The chest panel 107 also comprises a flexible cover 1075 that forms the exterior part of the chest panel 107.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

What is claimed is:

1. A dog harness assembly comprising:
a harness body adapted to be positioned on a chest portion of a dog, a pair of restraint loops coupled with the harness body and adapted to pass respectively under the left and right foreleg pits of the dog, each restraint loop comprising a clasp adapted to be releasably fastened to a fastening arrangement provided in the harness body;
a connector located in the harness body for engaging with a locking portion of a leash for allowing a user to exert a force for controlling movements of the dog wearing said harness when the harness is connected to the leash through said connector;
a key or combination actuated locking arrangement coupled with said connector to provide a lockable connection between the leash and the harness wherein in a locked configuration a leash connector is prevented from being uncoupled from the connector;
wherein the locking arrangement is coupled with said fastening arrangement such that in the locked configuration the clasps of the restraint loops engage with the locking portion of the leash to prevent the clasps from being released from the fastening arrangement and wherein in an unlocked configuration, each can clasp only be released from the fastening arrangement after the leash connector has been uncoupled from the connector and by additionally actuating a clasp release mechanism provided on said harness body.

2. A dog harness assembly in accordance with claim 1 wherein each of the said clasps in a fastened configuration cooperate to define a through opening for engaging with said locking portion of the leash.

3. A dog harness assembly in accordance with claim 2 wherein each clasp comprises a hook portion that is structured to partially surround and engage the locking portion of the leash to prevent the clasps from being released from the harness body when the locking portion is located in the opening in the locked configuration.

4. A dog harness assembly in accordance with claim 1 wherein the fastening arrangement comprises a pair of biased retainers, each biased retainer being configured for releasably engaging and retaining a respective clasp.

5. A dog harness assembly in accordance with claim 4 wherein each biased retainer comprises a notch that is structured to be received in a detent provided along a peripheral portion of the respective clasp such that one or more biasing structures associated with each biased retainer applies a biasing force on the notch to push the notch into the detent.

6. A dog harness assembly in accordance with claim 4 wherein each of said biased retainer is located within a recessed channel provided in the harness body.

7. A dog harness assembly in accordance with claim 4 wherein the clasp release mechanism comprises a pair of clasp release members, each clasp release member being linked with a corresponding biased retainer of the pair of biased retainers and comprising an exposed tab portion such that applying a sufficiently high pushing force on the tab member overcomes the biasing force applied on each biased retainer and releases the notch of the biased retainer from the detent of the respective clasp.

8. A dog harness assembly in accordance with claim 6 wherein pushing the tab results in movement of the biased retainer within the recessed channel in an axial direction aligned along the spine of the animal wearing said harness assembly.

9. A dog harness assembly in accordance with claim 1 wherein the connector comprises a biased locking plate positioned within a recessed portion of the harness body, the locking plate comprising an opening defined by engagement portions of the locking plate for receiving an elongate part of the locking portion and wherein one or more biasing structures applying a biasing force on the locking plate to push the engagement portions of the locking plate into engagement with a detent provided on the locking portion.

10. A dog harness assembly in accordance with claim 9 further comprising a leash releasing mechanism comprising a leash releasing tab that is exposed for receiving a pushing force from a user such that applying a sufficiently high pushing force on the leash releasing tab overcomes the biasing force applied on the locking plate and results in movement of the locking plate to sufficiently disengage the engagement portion of the locking plate to allow the locking portion to be withdrawn out of the opening of the locking plate.

11. A dog harness assembly in accordance with claim 9 wherein the locking arrangement, in the locked configuration, resists movement of the locking plate sufficiently to prevent the locking portion from becoming disengaged with the locking plate.

12. A dog harness assembly in accordance with claim 11 wherein the locking arrangement comprises a combination lock with one or more rotating dials mounted on a biased lock spindle with each rotating dial being associated with a notched circular disc such that rotation of one or more of the rotating dials along the spindle results in rotation of the notched disc wherein the locking plate comprises one or more corresponding apertures, each aperture being sized for accommodating the dial and the associated notched disc such that in an unlocked configuration, the notch is located within the aperture thereby allowing the locking plate to be pushed when force is applied on the leash releasing tab and wherein in the locked configuration the disc portion of the notched disc becomes lodged in the aperture thereby preventing movement of the locking plate.

13. A dog harness assembly in accordance with claim 12 further comprising a cam member associated with the biased spindle whereby turning the cam results in the one or more rotating dials becoming uncoupled from their respective notched circular discs to allow the combination lock to be reset wherein the movement of the cam member be effected by accessing a cam screw associated with the cam member, the cam screw being located along an underside of the harness body to prevent the combination lock from being reset while the harness body is being worn by the animal.

14. A harness assembly in accordance with claim 1 further comprising the leash wherein the locking portion of the leash comprises an elongate locking pin adapted to be engaged by the clasps and the locking arrangement, the locking pin extending from a relatively wider stop member and terminating in a tip that is configurated to be inserted into a locking hole provided on the cover plate of the harness body, the stop member being configured to abut with a cover plate located on the harness body to limit the insertion depth of the locking portion.

15. A harness assembly in accordance with claim 1 wherein the harness body comprises:
a back panel adapted to be located at or adjacent the animal's back region during use;
a chest panel adapted to be located at or adjacent the animal's chest region during use;
wherein in-use frontal portions of the back panel and chest panel are interconnected by a neck restraint loop to receive the animal's neck and wherein in-use rear portions of the back panel and chest panel are interconnected by the said pair of restraint loops adapted to pass respectively under the left and right foreleg pits of the dog; and
wherein the fastening arrangement, the connector and the locking arrangement are located on the back panel.

16. A harness assembly in accordance with claim 15 wherein each restraint loop comprises a pair of restraint straps that are movable relative to each other for adjusting the overall length of the restraint loop such that:
a first strap member, at a first end, is fixed to a first strap adjustment member and a second end of the first strap member is structured for attachment to the back panel or the chest panel; and
a second strap member, at a first end, is fixed to a second strap adjustment member and a second end of the second strap member is structured for attachment to the back panel or the chest panel;
wherein the first strap adjustment member further comprises a passage to allow a section of the second strap to be passed through and wherein the second strap adjustment member also comprises a passage to allow a section of the first strap to be passed through;
characterised in that the first and second adjustment members can be moved towards or away from each other to adjust the overall length of the restraint loop.

17. A harness assembly in accordance with claim 16 wherein the second adjustment member comprises a ratchet mechanism for engaging a ratchet engaging surface provided on the first strap and resist movement of the first strap through the passage of the second adjustment member.

18. A harness assembly in accordance with claim 17 further comprising a ratchet locking member configured to be located on an animal contacting surface of either of said first or second adjustment member to prevent access when the harness assembly is worn by the animal.

\* \* \* \* \*